United States Patent [19]
Schönauer et al.

[11] Patent Number: 5,883,345
[45] Date of Patent: Mar. 16, 1999

[54] SONIC POSITION MEASUREMENT SYSTEM

[75] Inventors: Uwe Schönauer; Stefan Spannhake, both of Berlin, Germany

[73] Assignee: Otis Elevator Company, Farmington, Conn.

[21] Appl. No.: 996,348

[22] Filed: Dec. 23, 1997

[51] Int. Cl.$^6$ .................................. B66B 1/24; G01B 7/00
[52] U.S. Cl. ...................................... 187/394; 324/207.12
[58] Field of Search .................................... 107/394, 391; 324/207.12

[56] References Cited

U.S. PATENT DOCUMENTS

| | | | |
|---|---|---|---|
| 3,898,555 | 8/1975 | Tellerman | 324/34 |
| 5,115,195 | 5/1992 | Peterson et al. | 324/207 |
| 5,223,680 | 6/1993 | Schmidt-Milkau et al. | 187/134 |
| 5,258,707 | 11/1993 | Begin et al. | 324/207.12 |
| 5,274,328 | 12/1993 | Begin et al. | 324/207.12 |
| 5,306,882 | 4/1994 | Gerwing et al. | 187/394 |
| 5,406,200 | 4/1995 | Begin et al. | 324/207.12 |
| 5,736,695 | 4/1998 | Hoepken | 187/394 |

FOREIGN PATENT DOCUMENTS 0 694792 A1   1/1996   European Pat. Off. .

OTHER PUBLICATIONS

Years of Novelty, Variet and Flexibility Made the Famous Reputation, Consul Electronics Engineering LTD Brochure—Israel (undated).

*Primary Examiner*—Robert E. Nappi

[57] ABSTRACT

A sonic position sensing system for measuring the position of an object, such as an elevator, includes transmitting a sonic signal along a conductor by a transmitter; receiving said sonic signal at a first receiver, located a first distance along said conductor from said transmitter; receiving said sonic signal at a second receiver located a second distance from said transmitter and on an opposite side of said transmitter from said first receiver; calculating a first distance between said transmitter and said first receiver; calculating a second distance between said transmitter and said second receiver; and calculating a total measured distance between said first receiver and said second receiver as the sum of said first distance and said second distance as the sum of said first distances and said second distance. The first or second distances may be scaled by the total measured distance to compensate for temperature effects. The position may also be corrected for velocity and/or acceleration of the object.

15 Claims, 4 Drawing Sheets

# SONIC POSITION MEASUREMENT SYSTEM

TECHNICAL FIELD

This invention relates to a position measurement system and more particularly to a sonic position measurement system.

BACKGROUND OF THE INVENTION

It is known in the art of sonic position measurement systems to use an ultrasonic transmitter connected to the object whose position is to be detected. It is also known to have the sonic transmitter transmit a sonic pulse along a sound signal conductor which extends along the path which the object moves, the conductor having a predetermined sound propagation speed. The sonic pulse is sent in both directions along the conductor and is received by receivers at each end of the conductor, between which the object moves. Each receiver provides an electrical signal (indicative of when the pulse arrives at the respective receiver) to an evaluation circuit, which measures the time difference between the arrival of the pulse at the two receivers. From this time difference and the known speed of sound in the conductor, the position of the object between the receivers is determined. Such a system is described in European patent application EP 0,694,792 A1, published Jan. 31, 1996 filed Jul. 21, 1995, applicant K. A. Schmersal GmbH and Co. of Germany.

In an elevator application, the operation of an elevator depends on accurate and reliable position and speed information. This information is used to control the motion of the elevator as well as certain safety roles and operations, such as opening of the doors. Modern elevators use a high-resolution position information from a source such as an incremental encoder on a motor to control the speed profile. However, for safety-relevant functions they rely on additional discrete switches in the hoistway.

One way to implement a high-resolution measurement of the elevator car's position in the hoistway is to use the sonic position sensor discussed hereinbefore. In that case, the measurement ultrasonic pulse is launched along a wire from the car to the receivers at the bottom and top of the hoistway. From the difference of the reception times, the position of the car is calculated.

However, such a system has numerous disadvantages. In particular, if the length of the signal conductor changes due to temperature effects it induces inaccuracies into the measurements of the location. Furthermore, using the difference between the reception times provides only one channel of position information. Thus, an accidental displacement of a receiver or any other change in length of the signal path results in erroneous measurements without the ability of being detected from the signal information. Further, inaccuracies induced by temperature-dependent variations in the signal speed are fully transferred to the position measurements. Accordingly, it is desirable to overcome these drawbacks for an elevator application.

DISCLOSURE OF THE INVENTION

Objects of the invention include provision of a sonic position measurement system which is fault-tolerant and accurate over temperature.

According to the present invention, a method for measuring the position of an object, includes: (a) transmitting a sonic signal along a conductor by a transmitter connected to the object; (b) receiving said sonic signal at a first receiver, located a first distance along said conductor from said transmitter; (c) receiving said sonic signal at a second receiver located a second distance from said transmitter and on an opposite side of said transmitter from said first receiver; (d) calculating a first distance between said transmitter and said first receiver; (e) calculating a second distance between said transmitter and said second receiver; and (f) calculating a total measured distance between said first receiver and said second receiver as the sum of said first distance and said second distance.

The invention represents a significant improvement over the prior art sonic position measurement systems by adding an additional signal to indicate when the sonic pulse is transmitted, thereby allowing the system to detect a damaged or altered signal path (e.g., a mechanical displacement of a receiver, a loose sonic wire, or a change in the length of the sonic wire), or by irregular pulses coupled into the signal path by an outside source. Also, the present invention provides a reference condition of the distance between the receivers, which is used by the system to compensate for the expansion and contraction of a building or other inaccuracies caused by temperature variations. The invention may be used as a position measurement (or reference) system for an elevator in a hoistway or for detecting the position of any object that moves along a predetermined path.

The foregoing and other objects, features and advantages of the present invention will become more apparent in light of the following detailed description of the exemplary embodiments thereof, as illustrated in the accompanying drawings.

BEST MODE FOR CARRYING OUT THE INVENTION

Figure 1:
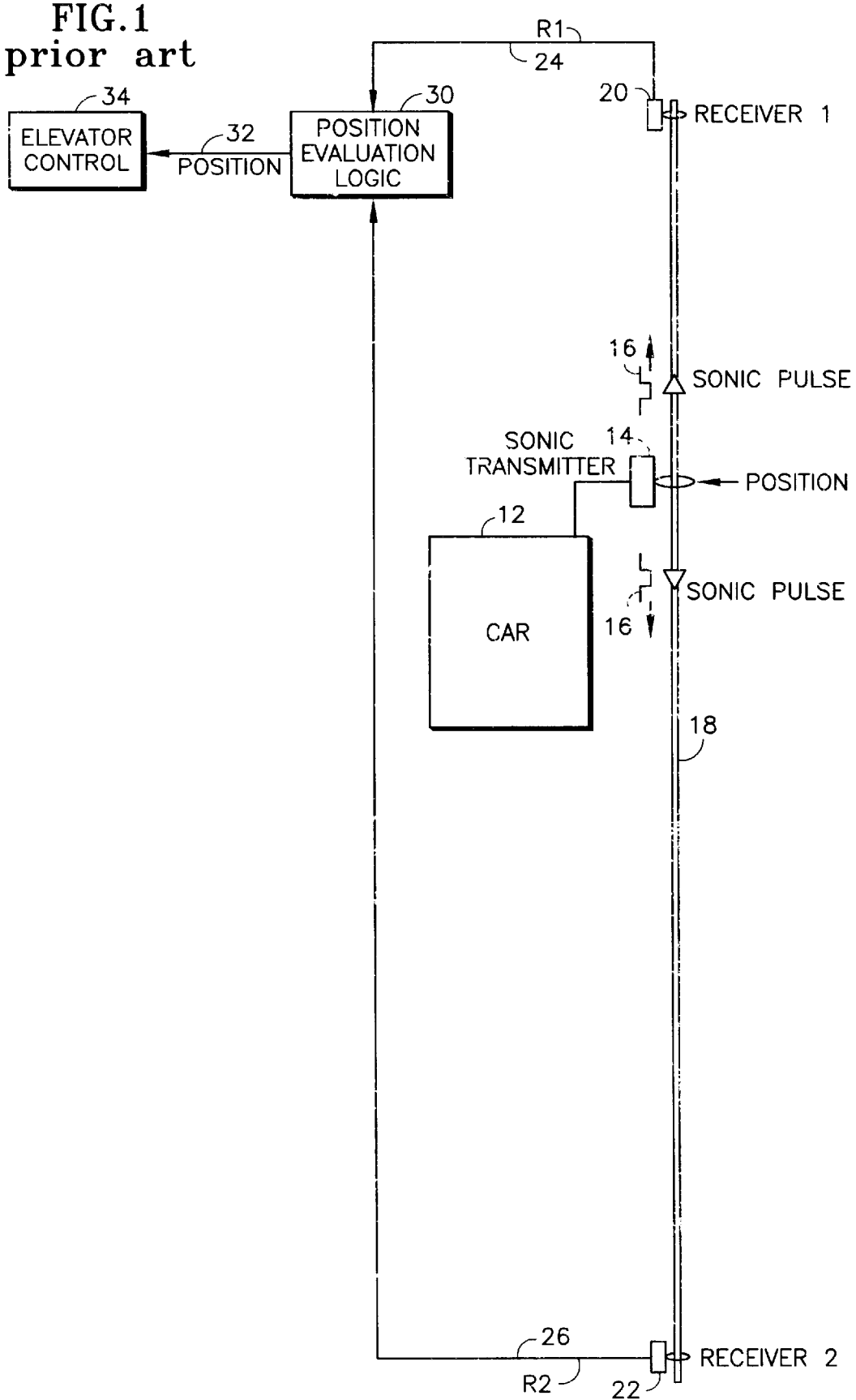
FIG. 1 is a block diagram of a prior art sonic position detection device.
Figure 3:
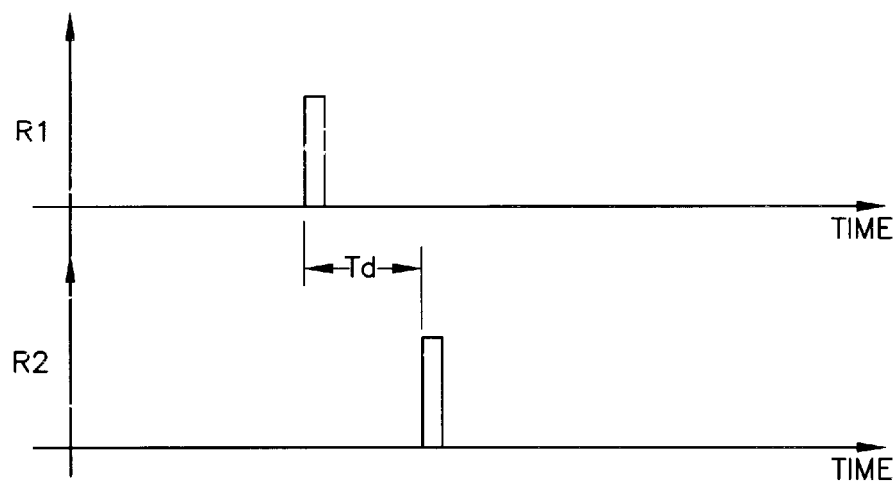
FIG. 3 is a time graph showing pulses from two receivers for the prior art system of FIG. 1.

Referring to FIGS. 1 and 3, a prior art position sensing system comprises an elevator car 12 having a sonic transmitter 14 (or signal coupler) connected thereto. The transmitter 14 generates a sound signal (or pulse) 16 at a predetermined rate and couples the sonic pulse to a sound signal conductor 18 (or wire) which is held or clamped at both ends by a clamping device (not shown). The sonic pulse 16 propagates away from the transmitter 14 in both directions along the wire 18 and is received at sonic receivers 20, 22 located at opposite sides of the transmitter 14 along the wire 18. When the receivers 20, 22 receive the sonic pulse 16, they each transmit an electrical pulse R1, R2 on lines 24, 26, respectively, to an evaluation circuit (or logic) 30. The logic 30 comprises the necessary hardware (e.g., a microprocessor, analogue or digital circuits) and/or software necessary to perform the functions described herein.

The logic 30 measures the time difference Td between the arrival of the two pulses 16 at the receivers 20, 22. The logic 30 computes the position of the elevator based on the time difference Td and the known speed of sound in the wire 18, and provides a position signal on a line 32 to an elevator controller 34. For example, Td may be converted to a distance (by the speed of sound) which is indicative of the distance from the midpoint between the receivers, the direction from the midpoint is based on the sign of Td. If the time Td is zero, the transmitter is located mid-way between the two receivers 20, 22. Such a system is similar to that described in European patent application EP 0,694,792 A1 published Jan. 31, 1996 filed Jul. 21, 1995.

Figure 2:
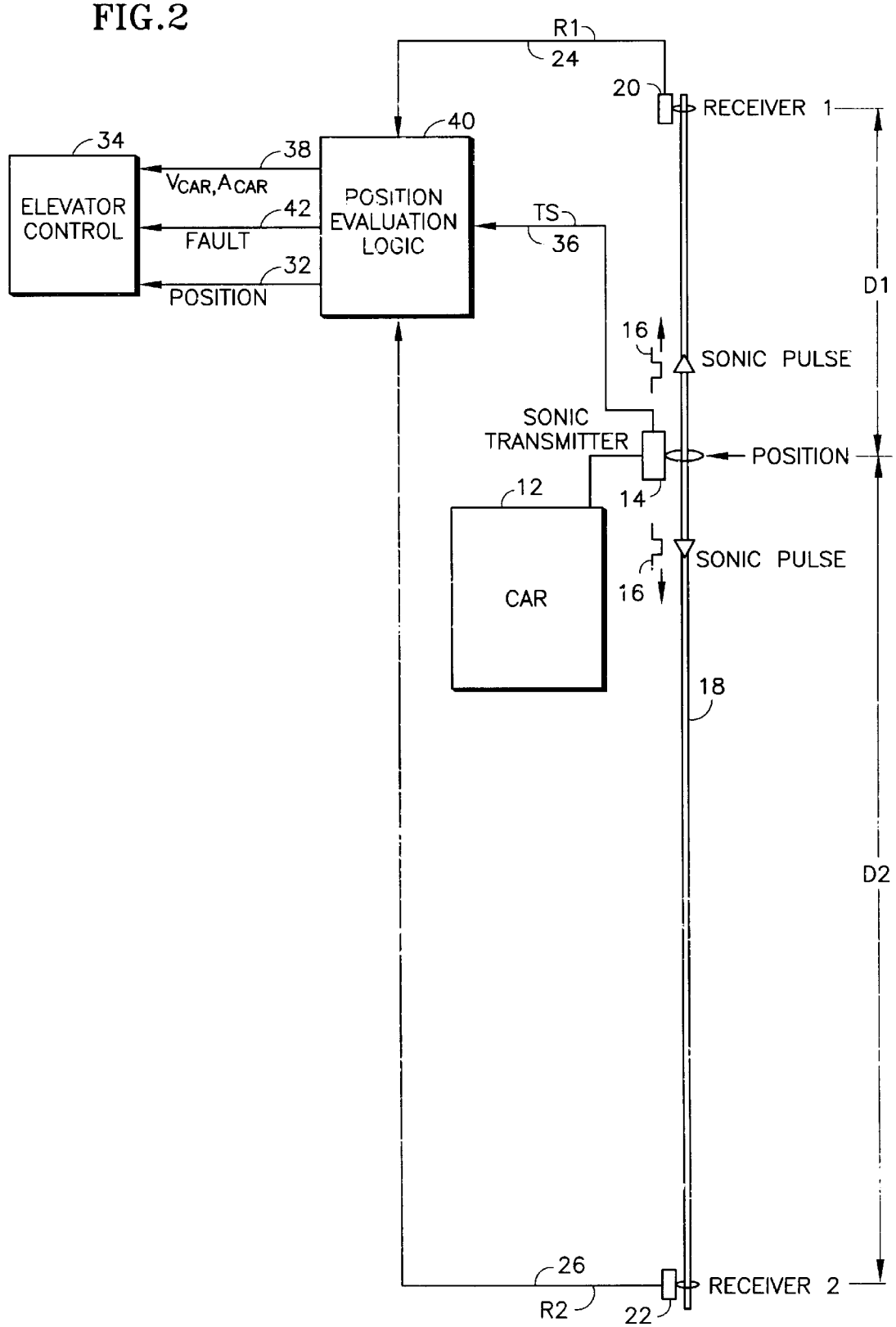
FIG. 2 is a block diagram of a sonic position sensing reference system in accordance with the present invention.
Figure 4:
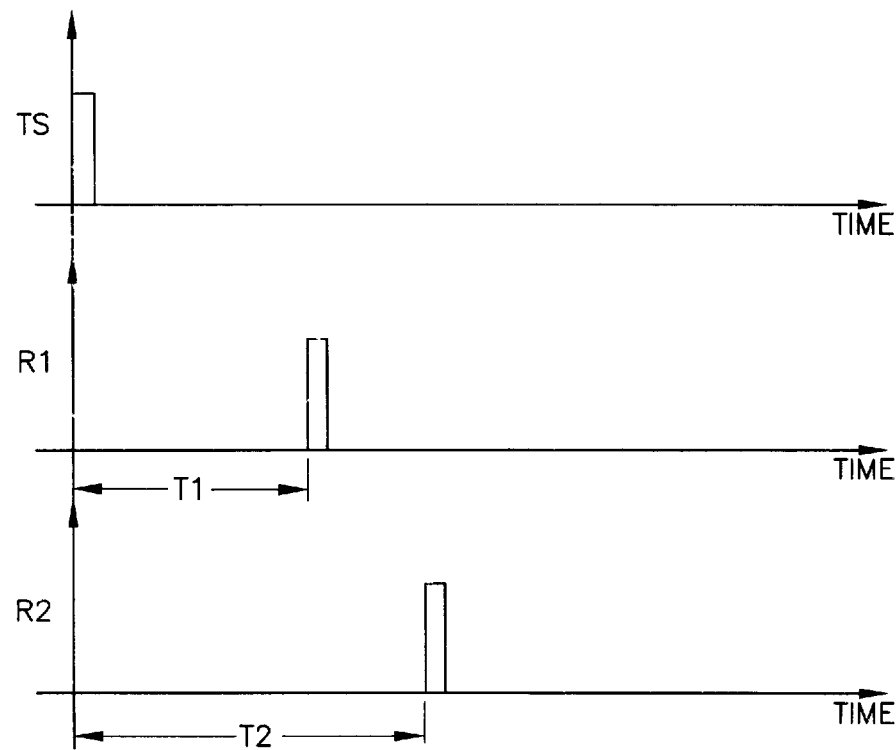
FIG. 4 is a time graph showing pulses from a transmitter and two receivers, in accordance with the present invention.

Referring to FIGS. 2 and 4, the position reference system of the present invention is similar to the system of FIG. 1, but adds a signal TS from the transmitter 14, which is provided on a line 36 to an evaluation circuit (or logic) 40 (which replaces the evaluation logic 30 of FIG. 1). The logic 40 comprises the hardware and/or software necessary to perform the functions described herein. The transmitter 14 provides the electrical signal (or pulse) TS on the line 36 when the sonic pulse 16 is launched (or sent) into the wire 18. The signal TS allows the measurement of the absolute distance from the transmitter 14 to each of the receivers 20, 22 via the measured flight times and the known speed of the sonic pulse 16, thereby providing two independent measurements of the position of the car in the hoistway.

Figure 5:
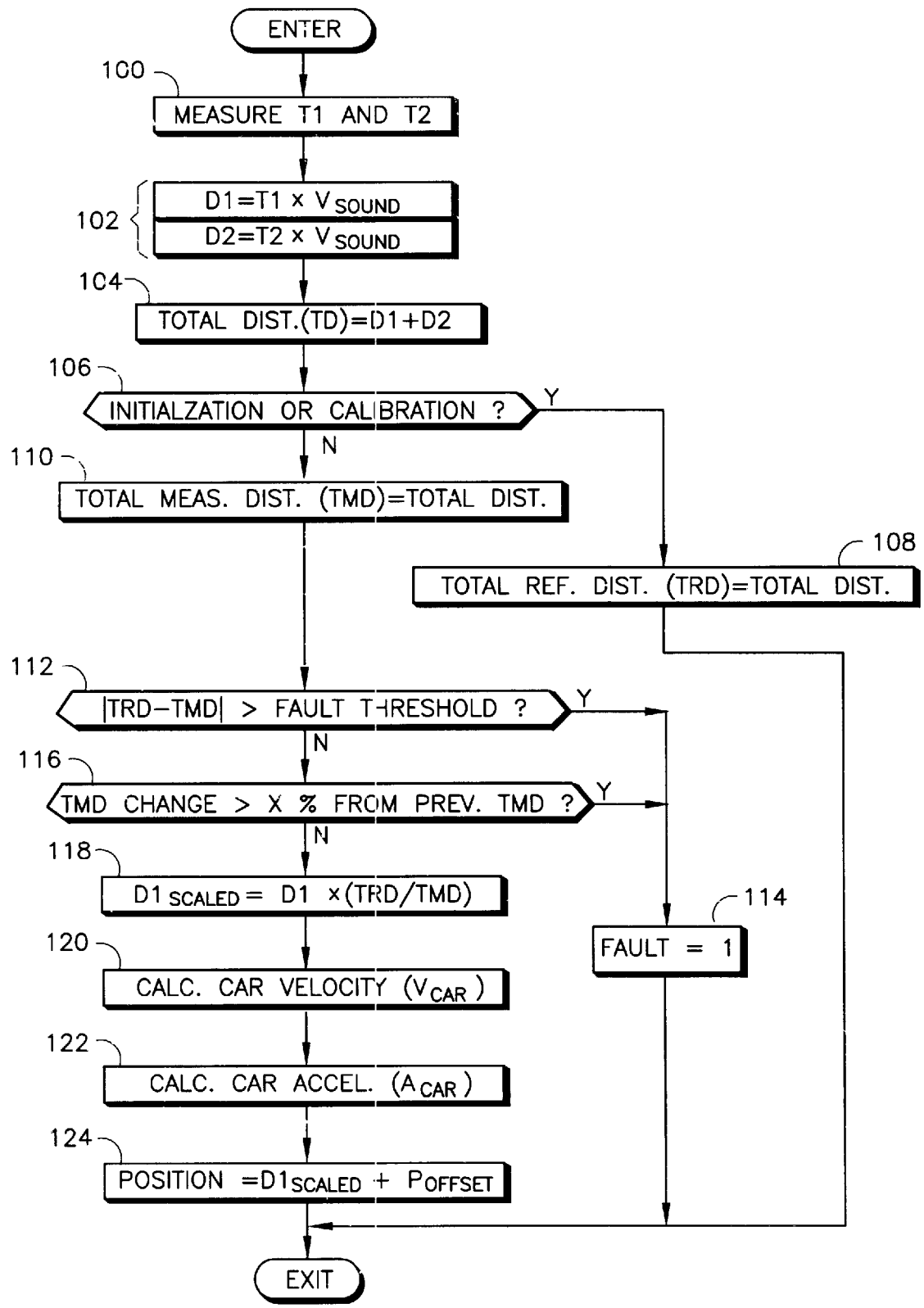
FIG. 5 is a logic flow diagram for position evaluation logic, in accordance with the present invention.

Referring to FIGS. 4 and 5, the evaluation logic 40 enters at a step 100 which calculates the time T1 between the pulses TS and R1, and the time T2 between the pulses TS and R2. Next a series of steps 102 calculate D1 and D2 based on T1 and T2 and the known speed of sound Vsound in the wire 18. Then, a step 104 calculates a Total Distance (TD) equal to the sum of DI and D2. Next, a step 106 determines whether the system is in initialization or calibration mode. If in calibration or initialization, TD is saved as a Total Reference Distance (TRD). If not in calibration or initialization, TD is saved as a Total Measured Distance (TMD). When the system is in normal measurement operation, the value of TMD is updated at a predetermined rate, e.g., each time position is calculated. All predefined positions in the hoistway, e.g. floor levels, etc., are related to TMD and/or TRD.

Next, a step 112 compares TMD to TRD, and if the difference between TMD and TRD is greater than a predetermined fault threshold, e.g., 8 mm, a step 114, sets a Fault flag to one which is provided to the control 34 on a line 42. Other fault thresholds may be used. Then, a step 116 checks whether the change in TMD is greater than a predetermined amount (x%), e.g., 50%, from the previous value of TMD. Other percent changes may be used if desired. If it is, the step 114 sets the Fault flag to one which is provided to the control 34 on the line 42.

Then, a step 118 compensates for temperature variations by calculating a scaled value of D1 as D1$_{SCALED}$ by multiplying D1 by a scale factor TRD/TMD. D1$_{SCALED}$ is equal to the absolute position of the elevator car.

The TRD and TMD parameters are used in the steps 112,116 to detect anomalies such as a damaged or altered signal path. Such anomalies can be caused by a mechanical displacement of a receiver, a disruption or mechanical displacement in the signal path (e.g., sonic wire pulled loose or changed length) or by irregular pulses coupled into the signal path by an outside source, etc.

Also, TRD and TMD are used in the step 118 to compensate for temperature variations with the scale factor. In particular, when TMD deviates gradually from the TRD and the deviations do not exceed the fault threshold, temperature variations are deemed to be the cause of the deviation and the calculations of D1 and/or D2 are scaled. Instead of or in addition to calculating D1$_{SCALED}$, the logic may calculate D2$_{SCALED}$ as D2×(TRD/TMD). The scaled distances are then indicative of the true position of the car in the hoistway. This scaling also compensates for the expansion of the building caused by temperature changes provided the temperature distribution in the hoistway is homogeneous.

Next, a step 120 calculates a velocity of the car V$_{CAR}$ using the equation:

$$V_{CAR} = \frac{|\text{Position}(n-2) - \text{Position}(n-1)|}{\Delta T}$$

where Position(n−2) and Position (n−1) are the Position values calculated in the previous two calculations of Position and ΔT is the update rate of the position calculation. The velocity V$_{CAR}$ provides an adjustment to the value of D1$_{SCALED}$ to compensate for changes in the car position during the delay time (Td) from when the sonic signal 16 is launched into the conductor 18 to when the position signal is provided to the control 34. The delay time Td comprises two main components, a sound propagation delay of the sonic signal along the conductor 18 and a computation time/update rate for the logic 30 to provide the position signal.

The propagation delay component of the time delay Td is determined based on the longer of the two propagation times T1,T2 (for the current position calculation) if the logic waits to receive both T1 and T2 before calculating position (i.e., TMD is calculated at the same update rate as position). Alternatively, the shorter of the two times T1 ,T2 may be used if the calculation updates the total distance TMD at a slower update rate than the calculation of position. The computation component of Td is predetermined based on the average update rate and computation time of the logic 30. Other techniques may be used to calculate Td.

In addition to velocity correction, the logic 30 may also provide acceleration correction of position, i.e., change in velocity over the delay time Td. In that case, a step 122 calculates the car acceleration A$_{CAR}$. The car acceleration A$_{CAR}$ may be calculated directly from position, by taking the second derivative of position.

Next, a step 124 calculates a velocity and/or acceleration-corrected position signal which is provided on the line 32 to the control 34 by the equation:

Position=D1$_{SCALED}$+P$_{OFFSET}$ where P$_{OFFSET}$ is a velocity and/or acceleration correction term. For a velocity correction, P$_{OFFSET}$ may be (V$_{CAR}$×Td). For a velocity and acceleration correction P$_{OFFSET}$ may be (V$_{CAR}$×Td)+(½) A$_{CAR}$Td$^2$. Alternatively, to correct for both velocity and acceleration, the value of V$_{CAR}$ in (V$_{CAR}$×Td) may be adjusted based on an average change in velocity over the time delay Td. Other equations for compensating for velocity and/or acceleration may be used if desired.

Also, the logic 30 may provide the velocity V$_{CAR}$ and/or acceleration A$_{CAR}$ to the control 34 on lines 38. The control 34 may use V$_{CAR}$ and/or A$_{CAR}$ for safety systems or for floor alignment systems, or for other uses. Instead of calculating V$_{CAR}$ and/or A$_{CAR}$ in the steps 120,122, respectively, V$_{CAR}$ and/or A$_{CAR}$ may be provided to the logic 30 by a velocity signal from another device such as a velocity sensor or the control 34.

Also, the value of Position may be filtered or averaged over a predetermined number of updates. For example, the calculation of D1$_{SCALED}$ may be performed at a first update rate, e.g., 1 millisecond (msec), and filtered or averaged over a predetermined number of updates, e.g., 3 to 10 updates.

Then, the calculation of Position may be performed at a slower update rate, e.g., 10 msec, using the filtered value of $D1_{SCALED}$. Other update rates may be used if desired. Also, in that case, the value of Td for correcting for velocity and/or acceleration may be an averaged or filtered value of Td.

The velocity and/or acceleration correction of the position is not required for the present invention, but may be needed to provide the desired accuracy of position. If velocity and/or acceleration correction is not employed, the steps 120, 122, respectively, would not be performed and the step 124 would set Position equal to $D1_{SCALED}$ or $D2_{SCALED}$, as appropriate.

The sound signal conductor 18 may be a steel rail or a wire cable or other suitable waveguide for propagating an ultrasonic signal having a predetermined sound propagation speed. For example, if the sound signal conductor 18 is made of steel, the speed of sound Vsound in the conductor 18 is about 5,300 meters/second. With a time resolution of 188 nanoseconds the local resolution of the measurement path is approximately 1 mm. Other materials with other sound propagation speeds may be used.

The sonic transmitter 14 may be the same as or similar to a transmitter made by K. A. Schmersal GmbH & Co. of Germany; however, the transmitter 14 has the additional output signal TS. The transmitter 14 may operate inductively to couple an electrical pulse received from a pulse generation circuit (not shown) into the sonic pulse on the wire 18.

The sonic receivers 20, 22 may be the same as or similar to receivers made by K. A. Schmersal GmbH & Co. of Germany. The receivers 20,22 may be a piezoelectric signal output coupler, or be inductive or capacitive. Other types of transmitters and/or receivers may be used if desired to couple the sonic signal to and from the wire 18.

Also, the signals R1,R2,TS on the lines 24,26,36 may be optical, electrical, microwave, or any other type of the signal which is read by the logic 40. Further, instead of being transmitted over the lines 24,26,36, the signal R1,R2,TS may be transmitted through the air using known wireless technology, e.g., RF, microwave, optical, modulated, etc.

Although the invention has been described and illustrated with respect to exemplary embodiments thereof, it should be understood by those skilled in the art that the foregoing and various other changes, omissions and additions may be made without departing from the spirit and scope of the present invention.

What is claimed is:

1. A sonic position measurement system, comprising:
   a sonic transmitter which sends a sonic signal along a sonic conductor and which provides a sent signal indicative of when said sonic signal is sent;
   a first sonic receiver, located a first distance along said conductor from said transmitter, which receives said sonic signal from said conductor and provides a first received signal indicative of when said sonic signal is received;
   a second receiver, located a second distance from said transmitter and on an opposite side of said transmitter from said first receiver, which receives said sonic signal from said conductor and provides a second received signal indicative of when said sonic signal is received; and
   signal processing logic which receives said sent signal, said first receive signal and said second receive signal, and which calculates a first distance between said transmitter and said first receiver, which calculates a second distance between said transmitter and said second receiver, and which calculates a total measured distance between said first receiver and said second receiver as a sum of said first distance and said second distance, said signal processing logic identifying said total measured distance calculated at an initial time as a total reference distance, and identifying successive ones of said total measured distance calculated at successive times subsequent to said initial time as current total measured distances, and selectively providing successive indications of the position of said object as a function of successive ones of said first distance or said second distance in dependence upon the relationship between successive ones of said current total measured distance and said total reference distance.

2. The system of claim 1, wherein said logic comprises comparing said total measured distance to said total reference difference.

3. The system of claim 2, wherein said logic comprises determining whether said total measured distance deviates from said total reference distance by a predetermined amount.

4. The system of claim 1, wherein said logic comprises determining whether said total measured difference has changed by a predetermined amount from a previous value of said total measured difference.

5. The system of claim 1, wherein said logic comprises calculating a scaled first distance by multiplying said first distance by said total reference distance divided by said total measured distance.

6. The system of claim 4, wherein said logic provides a position signal indicative of said scaled first distance.

7. The system of claim 1, wherein said sonic signal is a sonic pulse.

8. The system of claim 1, wherein said system measures the position of an elevator in a hoistway.

9. The system of claim 4, wherein said logic provides a position signal indicative of said scaled first distance adjusted by the change in position over time.

10. A method for measuring the position of an object, comprising the steps of:
    first, calibrating the measurement process at an initial time by
      (a) transmitting a sonic signal along a conductor by a transmitter connected to the object;
      (b) receiving said sonic signal at a first receiver located a first distance along said conductor from said transmitter;
      (c) receiving said sonic signal at a second receiver located a second distance from said transmitter and on an opposite side of said transmitter from said first receiver;
      (d) calculating a first distance between said transmitter and said first receiver;
      (e) calculating a second distance between said transmitter and said second receiver;
      (f) calculating a total measured distance between said first receiver and said second receiver as the sum of said first distance and said second distance to provide a reference total difference;
    then, measuring the position of the object at successive times later than said initial time by successively
      (g) transmitting a second sonic signal along said conductor by said transmitter;
      (h) receiving said sonic signal at said first receiver;
      (i) receiving said second sonic signal at said second receiver;
      (j) calculating a third distance between said transmitter and said first receiver;

(k) calculating a fourth distance between said transmitter and said second receiver;

(l) calculating a current total measured distance between said first receiver and said second receiver as the sum of said third distance and said fourth distance; and (m) selectively providing an indication of the position of said object as a function of said third distance or said fourth distance, in dependence upon the relationship between said total reference distance and said current total measured distance.

11. A method according to claim 10 wherein said step (m) comprises:

determining if said total reference distance differs from said current total measured distance by more than a threshold amount, and if it does not, providing said indication of position.

12. A method according to claim 10 wherein said step (m) comprises:

determining if successive values of said current total measured distance differ by a threshold ratio, and if they do not, providing said indication of position.

13. A method according to claim 10 wherein said step (m) comprises:

providing said indication of the position of said object as said third distance or said fourth distance multiplied by the ratio of said total reference distance to said current total measured distance.

14. The method of claim 10, wherein said sonic signal is a sonic pulse.

15. The method of claim 10, wherein the object is an elevator.

\* \* \* \* \*